United States Patent Office 2,807,495
Patented Sept. 24, 1957

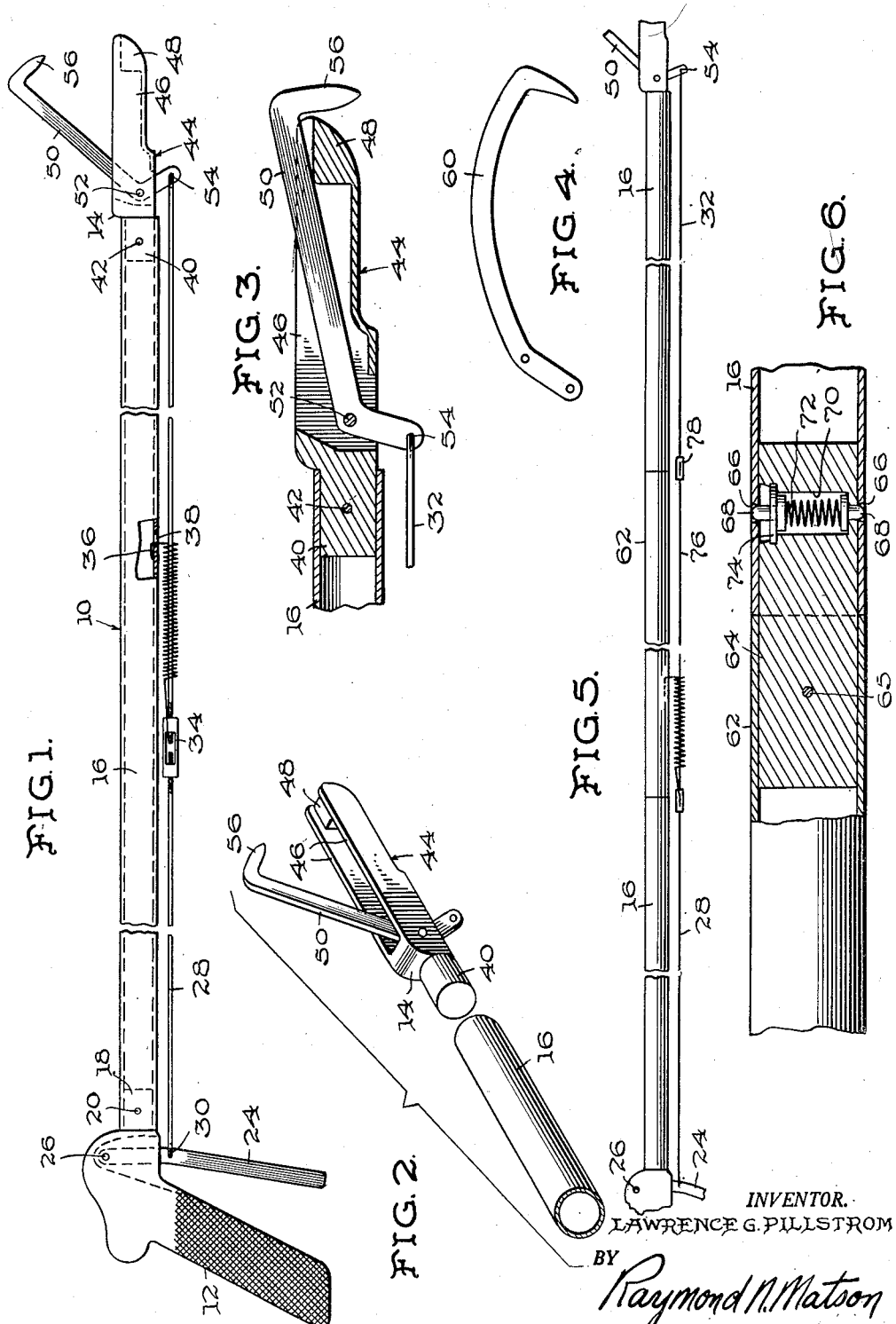

2,807,495

SNAKE TONGS

Lawrence G. Pillstrom, Altus, Ark.

Application April 5, 1954, Serial No. 421,101

9 Claims. (Cl. 294—104)

This invention relates generally to gripping devices and more particularly to a pair of tongs for use in catching snakes, frogs, turtles, small alligators, and any small living animals.

Tongs of various sorts are well known in the art but most of these are not adapted for the particular purpose in question. Such tongs as are intended for the purpose of catching small live reptiles or animals, are usually characterized by certain inherent disadvantageous features.

Among these are an excessive weight or a design requiring two handed manipulation of the tongs which is impractical in the rough terrain or water comprising the natural habitat of the snakes, etc.; a one-purpose design rendering the tongs inflexible as to use, a poor cooperative arrangement of the jaws enabling the escape of or damage to the snakes, etc.; and a lack of practical portability or storage due to the necessary length of the tongs.

Accordingly, the chief object of the present invention is to provide an improved tongs which will obviate the above and other disadvantages characterizing known structures.

Another important object of the present invention is to provide an improved tongs having a jaw structure which will enable various sizes of reptiles and animals to be gripped without their escape or suffering damage.

A further important object of the present invention is to provide an improved tongs which may be simultaneously held and operated by one hand to close the jaws upon a reptile or animal.

A still further important object of the present invention is to provide an improved tongs having a handle structure which enables an improved leverage to be readily transmitted to the jaws which are so designed as to facilitate their engagement with and trapping of a reptile or animal.

Another object of the invention is to provide an improved tongs which may be readily assembled for use, may be of various lengths, and may be readily disassembled for carrying, storage or shipping.

Another object of the invention is to provide an improved snake tongs which is strong but extremely light in weight, susceptible of ready and economical manufacture, and is rugged and of long life in use.

Other objects and advantages of the invention will become apparent during the course of the following description.

In its broadest aspect, the invention contemplates a tong structure wherein adequate leverage is obtained while the means for transmission thereof to the jaws is compactly arranged, wherein special jaw structure facilitates the trapping and holding of the reptile, etc., and wherein a one-handed holding and operation is enabled by the tongs structure which is dismountable.

In the drawings, I have shown one embodiment of the invention. In this showing:

Figure 1 is a side elevational view of the improved tongs comprising the present invention;

Figure 2 is a fragmentary perspective view illustrating the manner of assembly of the tongs;

Figure 3 is a fragmentary, central, vertical, longitudinal sectional view of the jaws of the tongs;

Figure 4 discloses a modified form of the pivotal jaw;

Figure 5 is a side elevational view of the tongs after being lengthened or extended by the insertion of a length of tubing; and Figure 6 is a central longitudinal sectional view to an enlarged scale showing the means for connecting the various sections of the tongs.

Referring to the drawings, numeral 10 indicates the tongs as a whole which comprise a handle 12, a headpiece 14, and a connecting hollow shaft 15, all being preferably formed of aluminum or other similarly light and strong metal or plastic.

The handle 12 is provided with a forwardly projecting tubular section 18 adapted to fit closely within the left end of the shaft 16 to which it may be secured by a suitable pin 20 or by the spring actuated pins disclosed in Figure 6 to be described.

The handle 12 extends substantially above the shaft 16 and is provided with a central recess 22 in this upper portion for the reception of the upper end of a trigger member 24 which is pivoted therein as at 26. The rear end of an operating rod 28 is pivotally connected to the trigger 24 just below the recess at 30, the trigger thereupon angling gently rearwardly toward the handle 12.

It will now be readily apparent that the arrangement of the pivot 26 materially above the axial line of the shaft 16 affords two important results. Firstly, the rod 28 may thereby be positioned close to the shaft for compactness of the tongs as a whole and yet receive adequate operational movement of the rod when the trigger 24 is pressed toward the handle 12. Secondly, the trigger is provided with a good moment arm about its pivot 26 with respect to the pivotal connection 30 so that an adequate pressure may readily be transmitted to the jaws of the tongs.

The operating rod 28 is connected at its forward end to a second rod 32 by means of a turnbuckle 34, the adjacent ends of the rods 28 and 32 being similarly threaded for this purpose. A spring 36 is hooked into an aperture 38 in the base of the shaft 16 and its other end is fastened to the turnbuckle 34 to urge the rods and the trigger 24 to "jaw-open" position. The jaws may be adjusted by the turnbuckle 34 from an "open" position of 90 degrees to an angle greater or less as desired.

The headpiece 14 includes a tubular portion 40 similar to 18 which fits snugly into the forward end of the shaft 16 and which again may be detachably fastened by a pin 42 or by the spring actuated pins of Figure 6. It will be apparent that the ends of the shaft 16 form seating sockets for the handle and headpiece members 18 and 40 and that the cross-sections thereof may be varied as desired.

A stationary jaw 44 projects forwardly of the headpiece 14 and comprises a pair of spaced side members 46 connected at their forward extremities by a nose portion 48 which is of lesser height than the sides and has a curved bottom surface to enable it to be readily slipped under a snake, etc. A movable jaw 50 is pivotally mounted in the slot between the sides 46 on a pin 52 and terminates in an angular portion to which the forward end of the operating rod 32 is pivotally connected as at 54.

The forward end of the pivotal jaw 50 terminates in a downwardly angled portion or hook 56, the angle between it and the main jaw 50 being less than 90 degrees. This hooked jaw constitutes an important feature of the invention as it materially assists in holding larger reptiles or animals in the jaws. It will be noted (Figure 2) that the top edges of the jaw sides 46 is of substantial width and forms a double supporting surface upon which reptiles, etc., may be clamped by the jaw 50 without injuring them.

Smaller reptiles tend to be urged forwardly toward the nose 48 which affords added support but being lower than the top edges of the sides 46, prevents lateral "wiggling" or escape when the jaw 50 is in clamping position as soft body portions of the reptiles or animals are pushed down between the walls of the stationary jaws 46. In Figure 4, I have shown a modified form of jaw 60 which is identical in structure and use with the jaw 50 except that the main jaw portion is curved to accommodate reptiles too large for the jaw 50.

Figures 5 and 6 disclose the use of added shafts to effectively lengthen the tongs 10. As shown, two shaft sections 16 are used and assembled to the handle 12 and headpiece 14 as before. An intermediate section 62 is inserted between the shafts 16 and includes at each of its ends a plug section 64 held by a pin 65 which seats in the adjacent end of each of the shafts 16.

A pair of diametrically opposed apertures 66 are formed in the shafts for the reception of snap locking detents 68 which are resiliently mounted in a bore 70 of the plug 64 by a spring 72, all being inserted from the upper side as shown and retained therein by a washer 74. The extension 62 requires the addition of a control rod 76 and a turnbuckle 78. In the event that only one extra shaft section is to be added, one of the plugs 64 may be removed from the section 62 so that the end will fit over the tubular portion 40 (or 18).

The operation of the tongs is believed to be apparent. Being of aluminum, the tongs may be moved along the ground and manipulated in any fashion with one hand. The spring 36 maintains the jaw 50 in wide open position and if the tongs are being moved along the ground, the curved bottom surface of the nose 48 enables the jaw 44 to be slid under a reptile, etc., whereupon pressure of the fingers on the trigger 24 immediately acts through the rods 28, 32 to close the jaw 50. Release of pressure by the fingers, of course, causes the jaw 50 to immediately open.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. A pair of tongs for catching reptiles, etc., comprising a shaft, a pair of jaws mounted on one end of said shaft, a handle fixed to the other end of said shaft, and means mounted adjacent said handle and operative to move one of said jaws, the other of said jaws comprising a pair of spaced members and a nose piece connecting said members, all combining to form a substantially wide support against which reptiles may be clamped by said one jaw.

2. A pair of tongs for catching reptiles, etc., comprising a shaft, a fixed jaw mounted on one end of said shaft and including a pair of spaced members and a nose piece connecting said members, all combining to form a substantially wide support against which reptiles, etc. may be clamped by said pivotal jaw, a second jaw pivotally mounted on said fixed jaw, a handle mounted on the other end of said shaft, a trigger pivoted in said handle, and means operably connecting said pivotal jaw and said trigger whereupon movement of said trigger toward said handle effects movement of said pivotal jaw toward said fixed jaw.

3. A device as recited in claim 2 wherein the pivot point of said trigger is on one side of the axis of said shaft and said connecting means on the opposite side to effect the close positioning of said connecting means to said shaft while maintaining full swinging movement of said pivotal jaw.

4. A device as recited in claim 2 wherein resilient means act against said pivotal jaw to maintain it in open position.

5. A device as recited in claim 2 wherein said connecting means includes means for adjusting the angle of swing of said pivotal jaw.

6. A device as recited in claim 2 wherein said shaft, fixed jaw and handle are detachably connected.

7. A device as recited in claim 6 wherein said connections include spring detent securing means.

8. A device as recited in claim 2 wherein said nose piece is a stop for said pivoted jaw.

9. A device as recited in claim 2 wherein said nose piece is of lesser height than said spaced jaw-forming members.

References Cited in the file of this patent

UNITED STATES PATENTS

| | | |
|---|---|---|
| 465,222 | Ulbricht | Dec. 15, 1891 |
| 525,923 | Ryder | Sept. 11, 1894 |
| 576,756 | Cole | Feb. 9, 1897 |
| 901,820 | Nelson | Oct. 20, 1908 |
| 1,105,684 | Nuttall | Aug. 4, 1914 |
| 2,214,177 | Raybould | Sept. 10, 1940 |
| 2,319,992 | Hubbard | May 25, 1943 |
| 2,523,661 | Lotz | Sept. 26, 1950 |
| 2,565,466 | Barker | Aug. 28, 1951 |